United States Patent
Hasegawa (10) Patent No.: US 7,669,680 B2
(45) Date of Patent: Mar. 2, 2010

(54) MOUNTING CONFIGURATION FOR A BRAKE CONTROL DEVICE ON A MOTORCYCLE, AND MOTORCYCLE INCLUDING SAME

(75) Inventor: Yosuke Hasegawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 316 days.

(21) Appl. No.: 11/640,710

(22) Filed: Dec. 18, 2006

(65) Prior Publication Data

US 2007/0145227 A1    Jun. 28, 2007

(30) Foreign Application Priority Data

Dec. 28, 2005   (JP)   ............... 2005-380494

(51) Int. Cl.
*B62D 61/02* (2006.01)
(52) U.S. Cl. ..................................... 180/219
(58) Field of Classification Search ................. 180/219; 303/137
See application file for complete search history.

(56) References Cited

U.S. PATENT DOCUMENTS

| 4,492,284 | A | * | 1/1985 | Hayashi ..................... 180/219 |
| 4,500,101 | A | * | 2/1985 | Aoki ........................ 280/152.1 |
| 4,702,339 | A | * | 10/1987 | Hayashi et al. ............. 180/219 |
| 4,834,221 | A | * | 5/1989 | Yoshinori et al. ........ 188/181 A |
| 5,419,625 | A | * | 5/1995 | Iwase et al. ............... 303/116.1 |
| 7,350,881 | B2 | * | 4/2008 | Asahi ......................... 303/137 |
| 2002/0050415 | A1 | * | 5/2002 | Kawamoto .................. 180/219 |
| 2005/0061572 | A1 | | 3/2005 | Misaki et al. |

FOREIGN PATENT DOCUMENTS

| EP | 0 624 498 A2 | 11/1994 |
| JP | 02-011448 | 1/1990 |
| JP | 10-175534 | 6/1998 |

* cited by examiner

*Primary Examiner*—Tony H. Winner
(74) *Attorney, Agent, or Firm*—Carrier, Blackman & Associates P.C.; Joseph P. Carrier; William D. Blackman (57) ABSTRACT

A mounting configuration is provided for mounting an ABS unit on a base model motorcycle which permits a relatively large-sized and heavy ABS unit to be easily mounted on a vehicle body frame. A V-shaped engine is longitudinally mounted on the frame, and a rear wheel is supported on a rear swing arm which is pivotally supported on the frame by a pivot shaft, the rear wheel driven via a drive shaft. An ABS unit is arranged on one side of the vehicle body in a space below and to one side of the pivot shaft so as to avoid interference with the rear swing arm or the like, thus it is possible to easily mount the ABS unit on a base model. Further, by arranging exhaust pipe system parts on another side of the vehicle body, it is possible to obtain a proper lateral balance of the vehicle body.

14 Claims, 10 Drawing Sheets

MOUNTING CONFIGURATION FOR A BRAKE CONTROL DEVICE ON A MOTORCYCLE, AND MOTORCYCLE INCLUDING SAME

CROSS-REFERENCE TO RELATED APPLICATIONS

The present invention claims priority under 35 USC 119 based on Japanese patent application No. 2005-380494, filed on Dec. 28, 2005. The subject matter of this priority document, including specification, drawings, and claims, is incorporated by reference herein.

BACKGROUND OF THE INVENTION

1. Field of the Invention

The present invention relates a brake control device for a motorcycle, and more particularly, to a mounting configuration of an anti-lock brake control unit (hereinafter referred to as ABS unit) on a motorcycle frame.

2. Description of the Background Art

An ABS unit is a known device which automatically controls hydraulic pressure of a hydraulic brake mechanism, in order to prevent a wheel from being locked during vehicle braking. The ABS unit is also referred to as an ABS modulator, and is primarily made up of an integral body including a hydraulic circuit, a pump and a valve. The ABS unit is a relatively large and heavy part.

In the prior art, in a vehicle body frame which includes left and right seat frame portions for supporting a seat thereon, it has been known to arrange an ABS unit below the seat and between the right and left seat frame members. Such a mounting configuration is disclosed, for example, in JP-A-10-175534.

A motorcycle is manufactured having a large number of parts, such as the above-mentioned seat frame members, mounted inside of the vehicle body frame. In order to provide a brake control device such as an ABS unit arranged on the base model motorcycle, it has been necessary to carry out a large design change to ensure a space for arranging the brake control device. Accordingly, it is an object of the present invention to provide a mounting configuration for an anti-lock brake unit which does not require a large design change when mounting such a brake control device on a base model motorcycle.

SUMMARY

To solve the above-mentioned problem, a first aspect of the invention is directed to a mounting configuration of a brake control device on a motorcycle. The motorcycle includes a vehicle body frame which supports an engine and a hydraulic brake mechanism thereon, and also includes a brake control device, for controlling hydraulic pressure of the brake mechanism, mounted on the vehicle body frame. In the first aspect of the invention, the brake control device is arranged below a pivot shaft which swingably mounts a front end of a rear swing arm to the vehicle body frame, where the swing arm supports a rear wheel thereon at a rear end thereof.

Although a space below a pivot shaft has been conventionally considered as a dead space, in which parts are difficult to arrange to prevent the parts from interfering with a suspension device such as a rear swing arm, a drive force transmission device such as a chain or a drive part such as a rear wheel, according to the first aspect of the invention, it becomes possible to arrange the brake control device below and to one side of the pivot shaft.

Accordingly, the brake control device is mounted on the motorcycle without adding a large change to design of the basic model of the vehicle. Further, the brake control device, which is a heavy object, can be arranged at a comparatively low position on the frame, thus contributing to the lowering of the center of gravity of the vehicle.

In addition to the features of the first aspect of the invention, a second aspect of the invention is characterized in that an exhaust pipe which extends from the engine is connected to a muffler. The muffler is arranged on a first one of the lateral sides of a vehicle body, and the brake control device is arranged on the other lateral side of the vehicle body.

According to the second aspect of the invention, the muffler and the brake control device, which are heavy objects, are arranged in a dispersed manner, thus helping to balance weight distribution in the lateral direction of the vehicle.

In addition to the features of the first aspect of the invention, a third aspect of the invention is characterized in that the motorcycle includes a drive shaft which drives the rear wheel, and the brake control device is arranged below the drive shaft.

According to the third aspect of the invention, the dead space can be further effectively utilized. That is, in adopting the chain drive structure as a drive means, when the brake control device is arranged below a chain line, the brake control device interferes with a chain and sprocket wheels and hence, it is necessary to offset the chain line and the brake control device in the right and left directions respectively. However, by employing a drive shaft as a drive means, instead of the chain and the sprocket wheels, it is possible to effectively make use of a space which cannot be utilized in a conventional chain-drive-type vehicle, thus helping to insure a minimal vehicle width.

A fourth aspect of the invention is directed to a motorcycle that includes a vehicle body frame which supports an engine and a hydraulic brake mechanism thereon. A brake control device, for controlling hydraulic pressure of the brake mechanism, is mounted on the vehicle body frame. According to the fourth aspect of the invention, the brake control device is arranged on a side surface of the engine.

According to the fourth aspect of the invention, by arranging the brake control device on a side surface of the engine, which has not previously been used for arranging parts and hence has formed a dead space, it is possible to mount the brake control device without adding a large change to a basic model of the vehicle.

In addition to the features of the fourth aspect of the invention, a fifth aspect of the invention is characterized in that an exhaust pipe, which extends from the engine, is connected to a muffler, which is arranged on a first of the lateral sides of the vehicle body, and the brake control device is arranged on the other lateral side of the vehicle body.

According to the fifth aspect of the invention, by arranging the muffler and the brake control device, which are heavy objects, in a laterally distributed manner, it is possible to help balance a distribution of weight in the lateral direction.

In addition to the features of the fourth aspect of the invention, a sixth aspect of the invention is characterized in that the engine is a V-type engine having a longitudinally-extending cylinder, and an air-cleaner cover is arranged on one side of the vehicle body so as to project toward an outside of the vehicle body. In addition, the brake control device is arranged on another side of the vehicle body so as to project toward an outside of the vehicle body.

According to the sixth aspect of the invention, due to the provision of the air cleaner cover and the brake control device, it is possible to make a difference between air flows at right and left sides of the vehicle.

In addition to the features of the fourth aspect of the invention, a seventh aspect of the invention is characterized in that the motorcycle includes a cover which covers the brake control device, and at least one of a wind introducing hole and an wind discharging hole is formed in the cover.

According to the seventh aspect of the invention, it is possible to efficiently cool the brake control device.

In addition to the features of the fourth aspect of the invention, an eighth aspect of the invention is characterized in that a joining portion is provided between the engine and the brake control device. The joining portion surrounds the center of gravity of the engine as viewed in a side view, thus arranging the brake control device at a position where the brake control device is overlapped with the center of gravity as viewed in a side view.

According to the eighth aspect of the invention, by providing the joining portion in the vicinity of the center of gravity, which becomes the center of vibration of the engine, and by arranging the brake control device so as to be situated proximate the center of gravity, it is possible to minimize an influence of engine on the brake control device. Accordingly, a mount between the brake control device and the engine and the mount structure between the engine and a frame can be made small and light in weight.

Modes for carrying out the present invention are explained below by reference to an embodiment of the present invention shown in the attached drawings. The above-mentioned object, other objects, characteristics and advantages of the present invention will become apparent form the detailed description of the embodiment of the invention presented below in conjunction with the attached drawings.

DETAILED DESCRIPTION

Selected illustrative embodiments of the invention will now be described in some detail, with reference to the drawings. It should be understood that only structures considered necessary for clarifying the present invention are described herein. Other conventional structures, and those of ancillary and auxiliary components of the system, are assumed to be known and understood by those skilled in the art.

Figure 1:
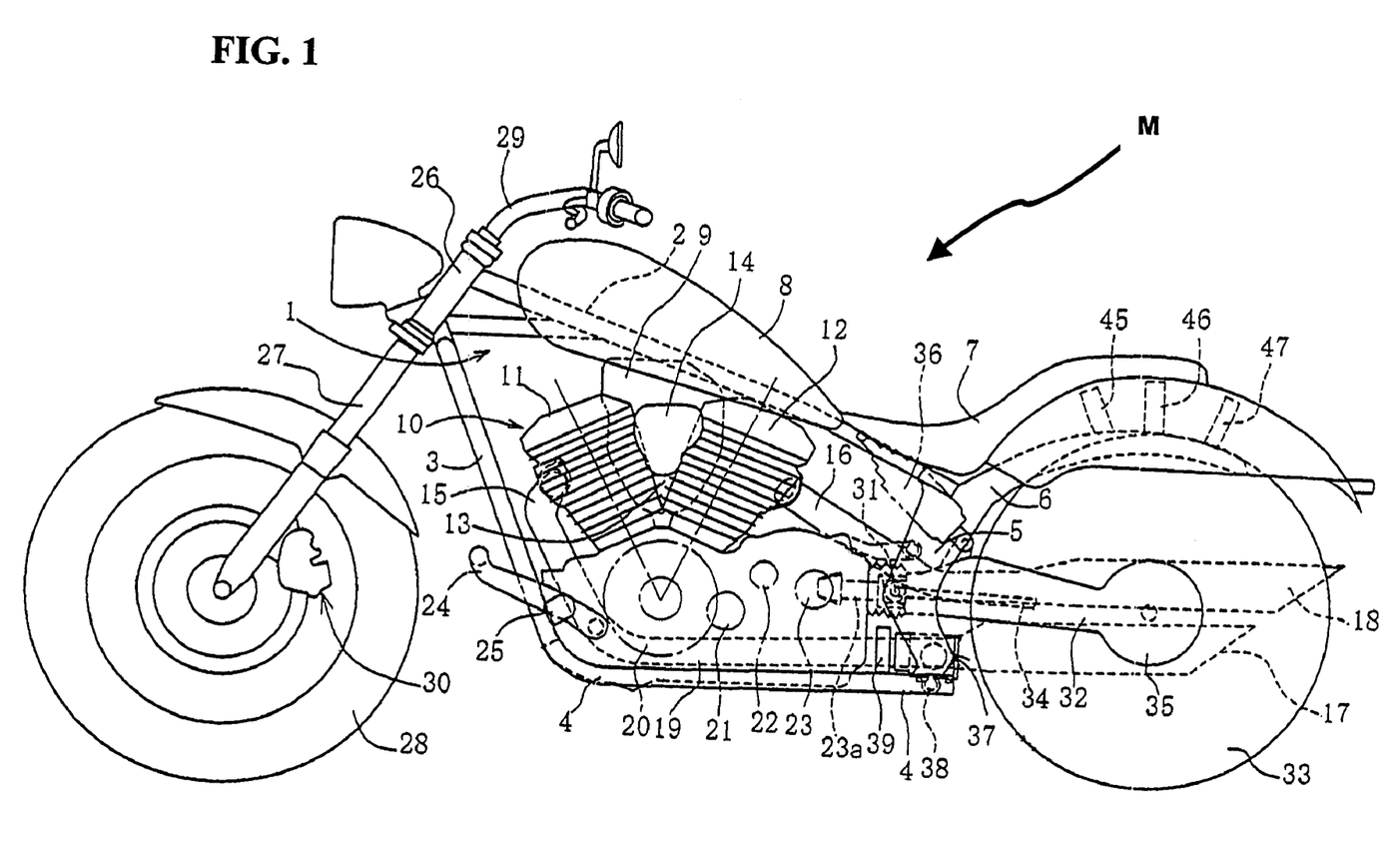
FIG. 1 is a left side plan view of a motorcycle according to a first embodiment in which an ABS unit is arranged below a pivot.

FIG. 1 is a side plan view of a motorcycle M, including a brake control device mounted on a portion thereof according to a first illustrative embodiment, in which an ABS unit 37 is arranged below a pivot shaft 31. The vehicle body frame 1 of the motorcycle M includes a head pipe 26 and a main pipe 2 extending rearwardly from the head pipe, the main pipe bifurcating from a front portion 2a into left and right rear portions 2b. The vehicle body frame also includes left and right side down pipes 3, left and right side lower pipes 4 and left and right pivot plates 5, and forms an approximately quadrangular frame shape as viewed in a side view.

The pivot plates 5 extend upward from the lower pipes 4 to the rear portions 2b of the main pipe 2, and continue rearwardly from a connecting portion thereof with the main pipe 2, thus forming seat support members 6. A seat 7 is supported on the seat support members 6. A fuel tank 8 is supported on the main pipe 2 in font of the seat 7. A air cleaner 9 and a V-type engine 10 are arranged below the fuel tank 8.

The V-type engine 10 is supported on the vehicle body frame 1. The air cleaner 9 is provided in a V-shaped space 13 formed between a front cylinder 11 and a rear cylinder 12. A carburetor casing 14 of the air cleaner 9 is arranged on a left side of the vehicle body shown in the drawing. The respective cylinders draw an air-fuel mixture from the fuel tank 8 and the air cleaner 9, which are disposed above the cylinders, and discharge an exhaust gas through exhaust pipes 15, 16. The exhaust pipes 15, 16 extend laterally to the right side of the vehicle body and are connected to mufflers 17, 18.

In FIG. 1, numeral 19 indicates a crankcase, numeral 20 indicates a crankshaft, numeral 21 indicates a main shaft, numeral 22 indicates a counter shaft, and numeral 23 indicates an output shaft gear. Numeral 24 indicates a change pedal which is pivotally mounted on a side surface of a front lower portion of the crankcases 19. Numeral 25 indicates a step which is mounted on the down pipe 3 in the vicinity of the change pedal 24. Here, all of these shafts are generally and schematically illustrated and, in the actual constitution, gears which are mounted on these shafts are meshed with each other to form a gear train, and a rotational force is sequentially transmitted.

The head pipe 26 defines a front end portion of the vehicle body frame 1. An upper portion of a front fork 27 is pivotally supported in the head pipe 26. A front wheel 28 is supported on a lower end of the front fork 27, and is steered by a handlebar 29 which is connected to an upper end portion of the front fork 27. Numeral 30 indicates a front wheel brake mechanism, including a hydraulically actuated disc brake caliper which cooperates with a brake disk to brake the vehicle, as needed.

A front end portion of a rear swing arm 32 is swingably supported between the pivot plates 5 by a pivot shaft 31. A rear wheel 33 is supported on a rear end of the rear swing arm 32, and the rear wheel 33 has an axle shaft thereof driven by way of a drive shaft 34 and a gear box 35 which are mounted on the rear swing arm 32. A rotational drive force is transmitted to the drive shaft 34 by way of an output shaft 23a of the engine. A hydraulic rear-wheel brake mechanism is also provided on the rear wheel 33, and although it is not shown in the drawing, it is similar to the front wheel brake mechanism shown at 30. A rear shock absorber unit 36 is mounted on a longitudinally intermediate portion between the rear swing arm 32 and the main pipe 2.

An ABS unit 37 is operatively attached to the vehicle body frame 1 at a location below and to one side of the pivot shaft 31, as viewed in a side view of the vehicle. The ABS unit 37 is disposed in the space between the pivot plates 5, and is supported on a cross pipe 38 which extends between the rear end portion of the lower pipes 4. A rear master cylinder 39 of the rear wheel brake is also provided in the vicinity of the ABS unit.

The ABS unit 37 is a known anti-lock brake (ABS) device, which automatically prevents locking of a wheel based on detection information such as a vehicle speed or the like. The front-wheel ABS, when the front wheel is about to be locked, automatically controls the operation of the front-wheel brake 30 by controlling hydraulic pressure of the front-wheel brake 30 to intermittently apply and release the brake, thus preventing the front wheel 28 from being locked.

The ABS unit 37 of this embodiment is a front-and-rear-wheel ABS system and is, although not shown in the drawing, respectively connected with the front-wheel brake 30 and the rear-wheel brake by hydraulic pipes. The hydraulic pipe on the front-wheel brake 30 side includes a pipe from a front master cylinder 40 (described later) and a pipe between calipers of the front-wheel brake 30. The latter pipe includes a pressure-decrease-side pipe and a pressure-increase-side pipe. The pressure-decrease-side pipe is provided for allowing the return of a working oil to decrease the hydraulic pressure from the calipers and the pressure-increase-side pipe is provided for increasing the hydraulic pressure by supplying pressurized oil to the calipers. The rear-wheel brake side also adopts a substantially similar pipe connection, and the pipe connection is arranged between the calipers of the rear-wheel brake and the rear master cylinder 39.

Figure 2:
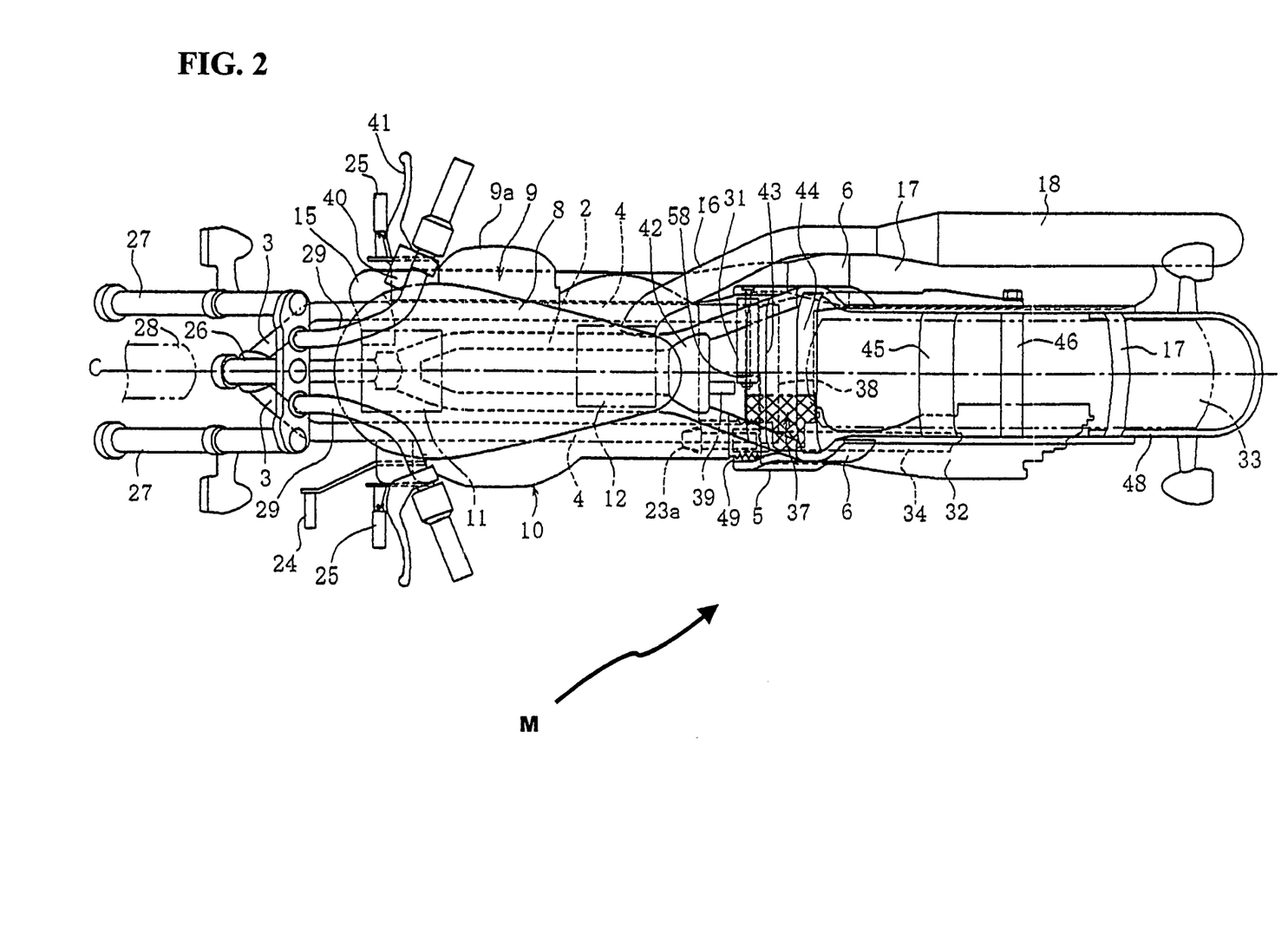
FIG. 2 is a top plan view of the motorcycle of FIG. 1, in which the seat is omitted for illustrative purposes.

FIG. 2 is a top plan view of the motorcycle M, in which the seat is omitted. With respect to a vehicle body center line C, the front forks 27, the steps 25, the handles 29, the lower pipes 3, the pivot plates 5 and the seat support members 6 are provided in right-and-left pairs respectively. As discussed above, the main pipe 2 also has a rear portion 2b thereof starting from a longitudinally middle portion thereof, the rear portion 2b formed in a right-and-left pair.

Exhaust-system parts including the exhaust pipes 15, 16 and the mufflers 17, 18, and the air cleaner 9 are arranged in a projecting manner extending outwardly at the right side of the vehicle body. The ABS unit 37 is arranged in an offset manner at the left side of the vehicle body. The rear master cylinder 39 is also arranged on the left side of the vehicle body, and is positioned between a rear end of the crankcase 19 and the ABS unit 37.

As shown in FIG. 2, a front master cylinder 40 is arranged in the vicinity of a right brake lever 41 of the right-side handle 29. The front master cylinder 40 generates hydraulic pressure upon manipulation of a right brake lever 41. Reinforcing cross plates 42, 43 are provided extending between the right and left main pipes 2. In addition, a cross pipe 51 is provided extending between the upper ends of the right and left pivot plates 5, and seat-supporting cross plates 44, 45, 46 are provided extending between the right and left seat support members 6. Right and left rear ends of the seat support members 6 are connected with each other by an approximately U-shaped connecting member 48, as shown in FIG. 2.

A protective rubber boot 49 is mounted on a joint portion of the drive shaft which is provided to a left-side front end portion of the rear swing arm 32 and this boot covers the joint portion connecting the drive shaft 34 and the output shaft 23a.

Figure 3:
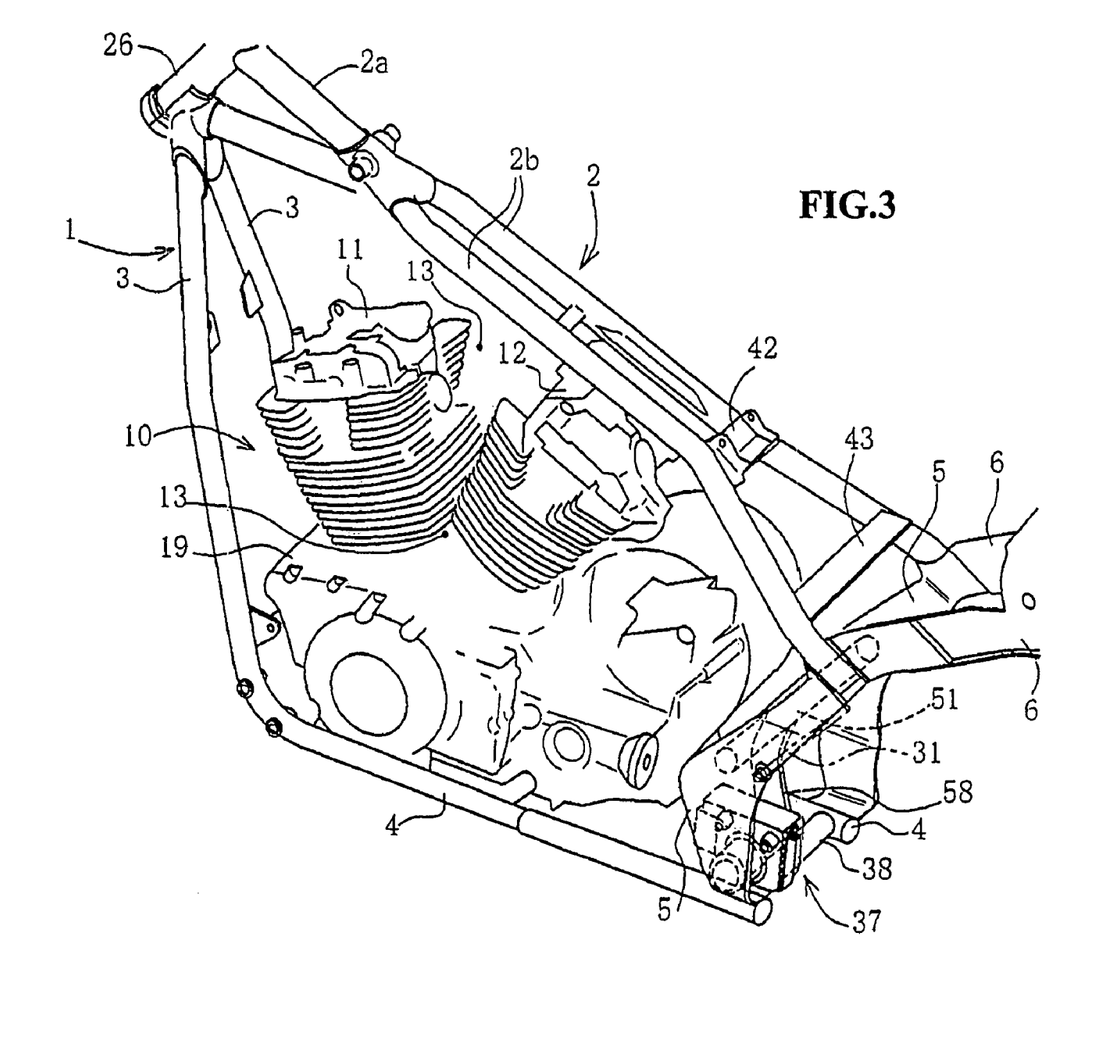
FIG. 3 is a side detail perspective view of an engine and a vehicle body frame portion of the motorcycle of FIG. 1.

FIG. 3 is a detail perspective view showing selected portions of the vehicle body frame 1 and the V-type engine 10. Here, the air cleaner 9 is omitted. The main pipe 2 includes one front portion 2a which is arranged along the vehicle body center line C, and two rear portions 2b which are formed by bifurcating in a right-and-left pair which extend substantially in parallel with each other. The right and left intermediate portions of the rear portion 2b are connected to each other by the reinforcing cross plate 42.

A front end of the rear shock absorber unit 36 (FIG. 1) is supported on the cross plate 42. The right and left rear portions 2b of the main pipe 2 extend further rearwardly while expanding in right-and-left direction from the cross plate 42 and are welded to outer sides of the respective shoulder portions of the right and left pivot plates 5.

The pivot plate 5 is a plate-like member formed by a suitable method such as casting using a suitable material having rigidity such as various kinds of metals such as light alloy and is continuously and integrally formed with the seat support members 6. A portion of the pivot plate 5 is bent and extends rearwardly to constitute the seat support members 6 beginning above a boundary where the rear ends of the main pipe 2 are connected to the pivot plate 5.

The right and left pivot plates 5 have intermediate portions thereof connected by the respectively upper cross pipe 51, and lower end portions thereof respectively welded to rear end portions of the right and left lower pipes 4. The right and left rear end portions of the lower pipe 4 are connected by a lower cross pipe 38. A vertical frame member 58 extends between respective intermediate portions of the upper cross pipe 51 and the lower cross pipe 38. The pivot shaft 31 extends laterally between respective vertically intermediate portions of the vertical frame member 58 and the pivot plate 5 on the right side of the vehicle body, such that the pivot shaft 31 is supported below and parallel to the upper cross pipe 51. Due to these vehicle body frame-side members, a shielded space 50 is defined whose right and left sides are surrounded by the pivot plate 5 and the vertical frame member 58, and whose upper and lower sides are surrounded by the upper cross pipe 51 and the lower cross pipe 38. The ABS unit 37 is arranged within the shielded space 50.

Figure 4:
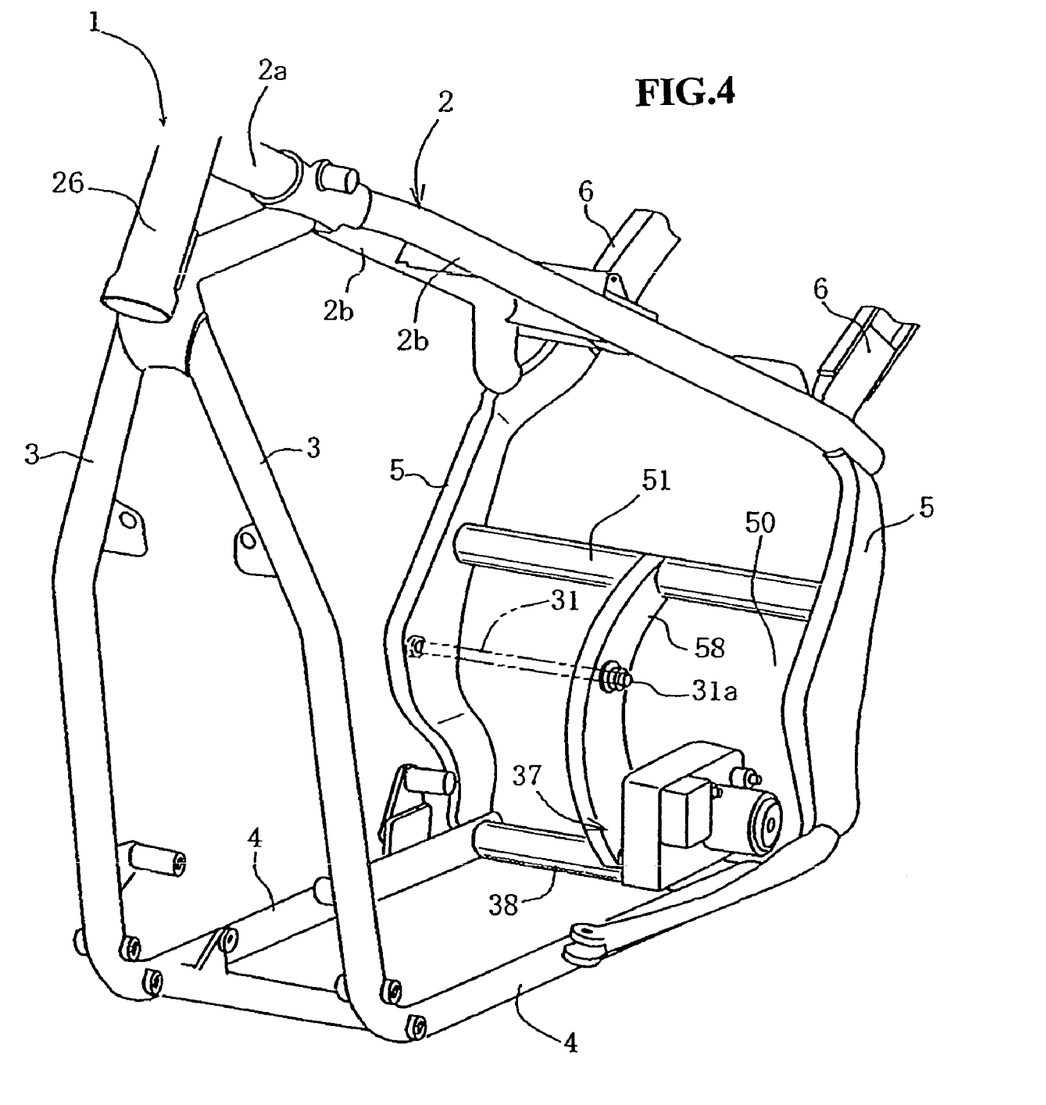
FIG. 4 is a front detail perspective view of a vehicle body frame and an ABS unit portion of the motorcycle of FIG. 1.

FIG. 4 is a detail perspective view showing a portion of the vehicle body frame 1, containing the ABS unit 37, from a front side. The right and left pivot plates 5 are interconnected by the upper cross pipe 51 above the pivot shaft 31. The ABS unit 37 is supported on the lower cross pipe 38, at a position offset towards the left side of the vehicle body from the vehicle center line. The pivot shaft 31 is formed in an elongated bolt shape, and a distal end of the pivot shaft 31, which is inserted from the pivot plate 5 on the right side of the vehicle body, penetrates the vertical frame member 58 and is fastened by a nut 31a.

Figure 5:
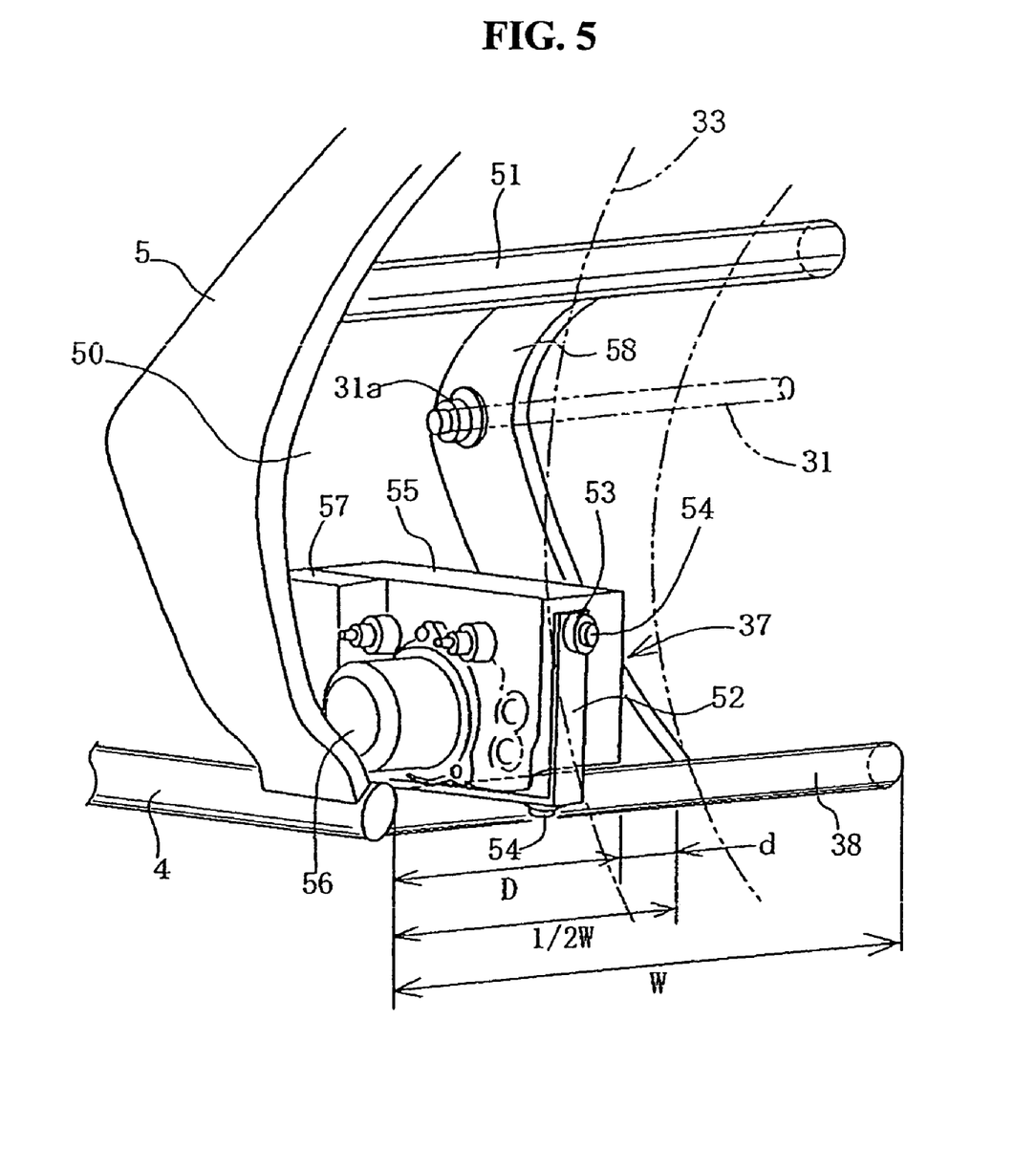
FIG. 5 is a rear detail perspective view of a mounting structure of the ABS unit on the motorcycle of FIG. 1.

FIG. 5 is a detail perspective view of the ABS unit 37 as viewed from a vehicle body rear side, showing that the ABS unit 37 is supported on the vehicle body frame side. The ABS unit 37 is mounted in a vibration-controlling manner on an L-shaped bracket 52 which is mounted on the lower cross pipe 38 in a suitable manner using a bolt 54 by way of a vibration control rubber grommet 53.

In this mounting configuration, the ABS unit 37 is detachably mounted using bolts 54 and grommets 53 at the following three points: one point at an upper end side in the vertical direction; and two (front and rear) points in the horizontal direction (only showing the point on the rear end side in the drawing).

The ABS unit 37 is a relatively large-sized and heavy member, and includes a rectangular box-shaped body portion 55, a cylindrical portion 56, which houses a pump, and a valve portion 57 such as a solenoid valve.

With respect to the mounting position of the ABS unit 37 on the lower cross pipe 38, the ABS unit 37 is arranged close to a left-side end portion of the lower cross pipe 38. Assuming a distance from the left-side end portion of the lower cross pipe 38 to an inside edge portion of the ABS unit 37 as D, and a width of the lower cross pipe 38 as W, a widthwise intermediate point, that is, the position corresponding to the center of the vehicle body, is a point at a position away from the end portion by a distance ½ W. The ABS unit 37 is offset to the vehicle-body left side by a distance d, where d is less than ½ W (d<½ W) with respect to the center of the vehicle body, thus providing a weight counter-balancing effect with parts (mainly exhaust-system parts) which are arranged to a right side of the vehicle body in an offset manner.

A mounting height of the ABS unit 37 is set at a level which prevents the ABS unit 37 from interfering with a front end portion of the rear swing arm 32 (FIG. 1) even when the swing arm is rocked about the pivot shaft 31. As shown in FIG. 1, the position of the pivot shaft 31 is arranged at a height substantially equal to a height of an output shaft 23a which is positioned on an upper side of the crankcase 19 and hence, a sufficiently large shielded space 50 is formed below and to one side of the pivot shaft 31, and on the opposite side of the vertical frame member 58 from the pivot shaft and the swing arm 32. As previously noted, the ABS unit 37 is arranged within the shielded space 50, so that movement of the rear swing arm 32 does not interfere with the ABS unit 37.

Further, the ABS unit 37 is arranged at a lower position below the pivot shaft 31 as viewed in side plan view and hence, the rear wheel 33, which is positioned behind the ABS unit 37, assumes a rearwardly extending or retracting position. As a result, interference of the ABS unit 37 with the rear wheel 33 is prevented, while the ABS unit 37 extends more or less rearwardly from the lower cross pipe 38.

Next, the manner of operation of this embodiment is explained. The space below the rear swing arm 32 has conventionally been considered as a space which is difficult to utilize in the arrangement of parts, since it has previously been difficult to prevent interference of these parts with a suspension device such as the rear swing arm 32 or with drive parts, such as a chain and the rear wheel. However, by arranging the ABS unit 37 below and to one side of the pivot shaft 31, and because the use of a drive shaft obviates the need for a chain, it is possible to effectively position the ABS unit 37 in the shielded space 50 below the pivot shaft 31, which conventionally has been considered as the space which is difficult to utilize.

Accordingly, assuming the arrangement which is obtained by removing the ABS unit 37 from the motorcycle shown in FIG. 1 and FIG. 2 as a base model of a motorcycle, it is possible to additionally mount the ABS unit 37 without adding a large change to the base model, thus easily manufacturing an enhanced model having the ABS unit 37 without significantly changing the vehicle body structure or the like.

Further, by adopting the drive transmission which uses the drive shaft 34 rather than a chain drive configuration, it is possible to further effectively make use of the dead space. That is, with respect to a case in which the drive transmission adopts the chain drive structure, when the brake control device is arranged below the chain line, the chain and a sprocket wheel interfere with the ABS unit and hence, it is necessary to offset the chain line and the brake control device in the lateral direction of the vehicle. In the present invention, by adopting the drive shaft configuration, the chain and the sprocket become unnecessary and hence, a space which cannot be effectively used in the conventional chain-driving-type vehicle is effectively utilized, thus maintaining a relatively narrow vehicle width.

Further, exhaust-system parts such as mufflers 17, 18, which are heavy objects, and the ABS unit 37 are arranged laterally in a distributed manner in relation to the vehicle body center C, and hence, it is possible to improve weight distribution of these components on the vehicle body in the lateral direction.

Further, the ABS unit 37, which is a heavy object, can be arranged at a relatively low position and hence, the arrangement also contributes to the lowering of the center of gravity of the vehicle.

Next, the second embodiment of the invention is presented in which an ABS unit 37 is arranged on an engine side. Here, a vehicle body to which the ABS unit 37 is applied is the same as the vehicle body shown in FIG. 1 and FIG. 2.

Figure 6:
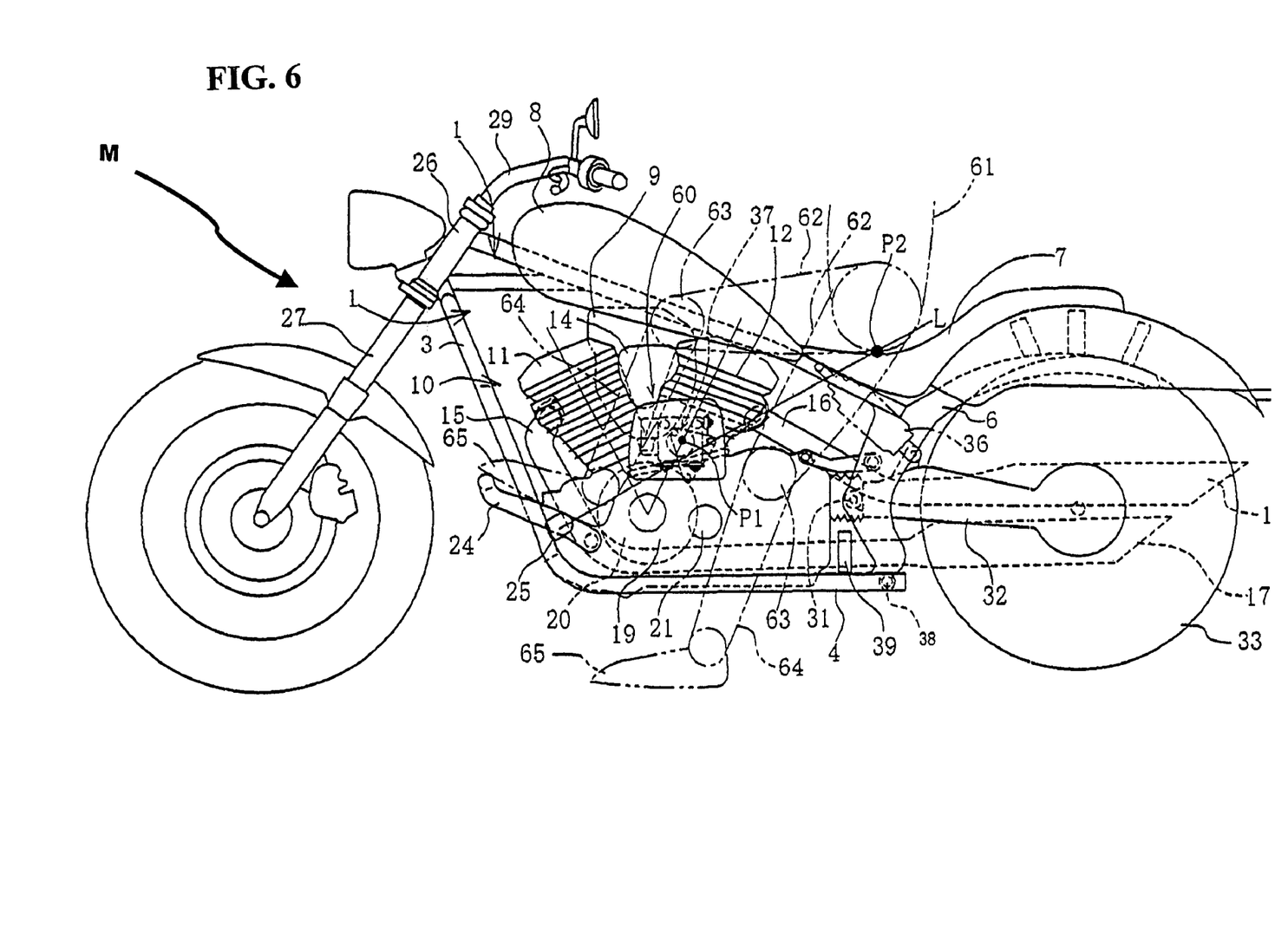
FIG. 6 is a left side plan view of a motorcycle according to a second embodiment.

FIG. 6 is a side plan view of the motorcycle M with an alternative mounting configuration of the brake control unit 37, according to a second embodiment hereof. In this embodiment, the ABS unit 37 is arranged on a side of a lower portion of in the V-shaped space 13 formed between the front cylinder 11 and the back cylinder 12. The ABS unit 37 has a periphery thereof, excluding the respective cylinder side, covered with a unit cover 60. The unit cover 60 is described in detail later.

The ABS unit 37 is situated on the engine such that, as viewed in a side view shown in the drawing, a maximum side projecting point P1 of the ABS unit 37 (corresponding to a distal end portion of the cylindrical portion 56 in this embodiment) is arranged in front of a straight line L which connects a sitting reference point P2 of the seat 7 and the center of the step 25 in a using state as viewed in a side view. The sitting reference point P2 of the seat 7 corresponds to a lowermost portion of an upper-side profile line which is formed by a top portion of a surface of the seat 7 in the widthwise direction and extends in the longitudinal direction. The sitting reference point P2 is a sitting reference point of a rider's seat, which is a front seat in a case of a tandem seat.

With respect to a standard riding posture of a rider 61 during traveling, the rider 61 assumes a posture in which the rider 61 bends a leg portion 62, a knee 63 is disposed on a side of a fuel tank 8 and above an air cleaner 9, a below-the-knee portion 64 obliquely traverses a side of the front cylinder 11, and a foot 65 is placed on the step 25. When the motorcycle is stopped, the leg portion 62 is extended, and the foot 65 is moved to an opposite side of the straight line L and is placed on the ground.

Figure 7:
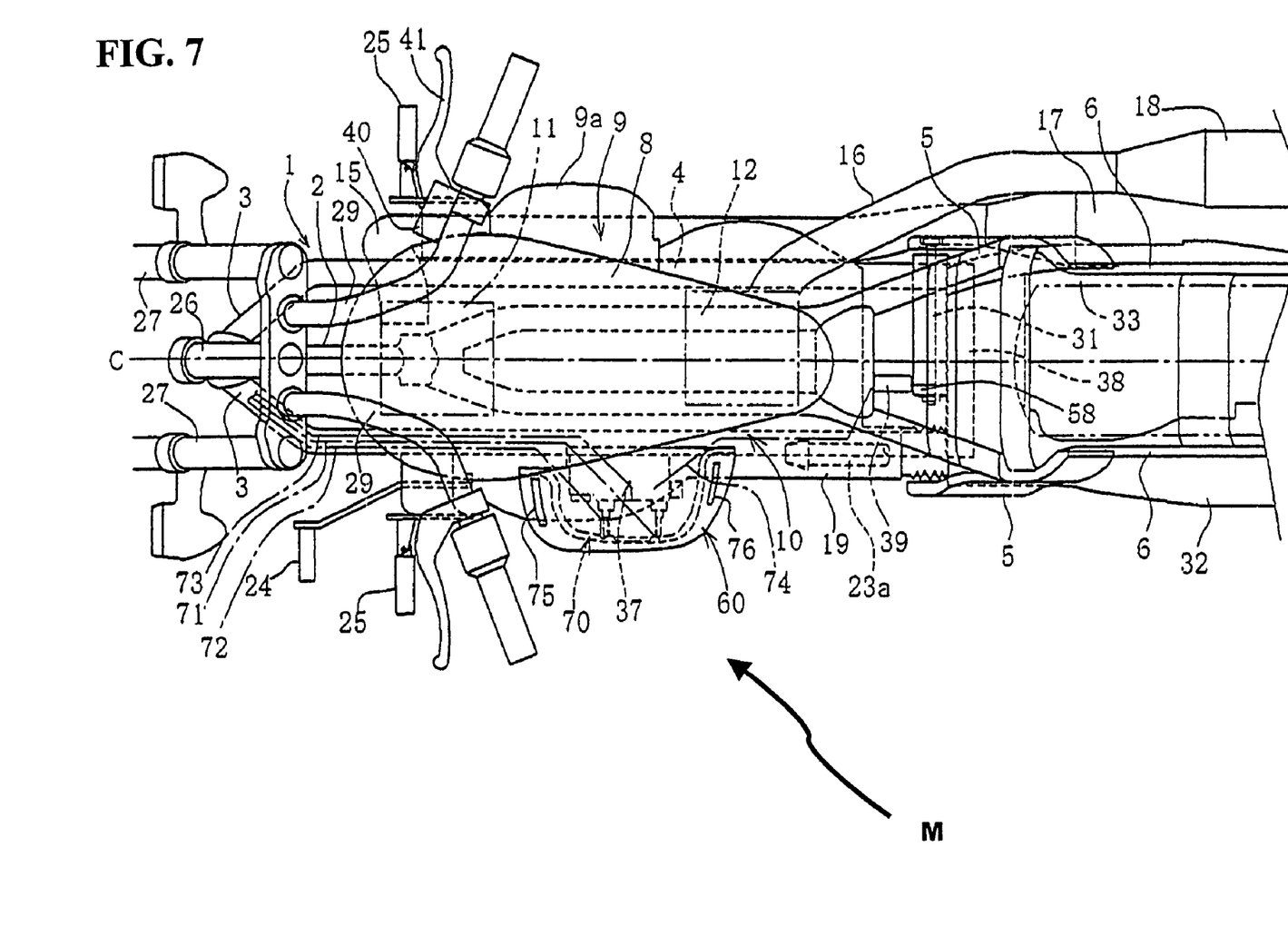
FIG. 7 is a top plan view of the motorcycle of FIG. 6.

FIG. 7 is a top plan view of the motorcycle M of FIG. 6. With respect to the vehicle body center C, exhaust-system parts which are constituted of exhaust pipes 15, 16 and mufflers 17, 18, and the air cleaner 9 are arranged on a right side of the vehicle body in a projecting manner, while the ABS unit 37 is arranged at a position which projects toward the left from a longitudinal intermediate portion of the fuel tank 8. The position where the ABS unit 37 is provided is arranged on a left side of the V shaped opening 13.

Figure 8:
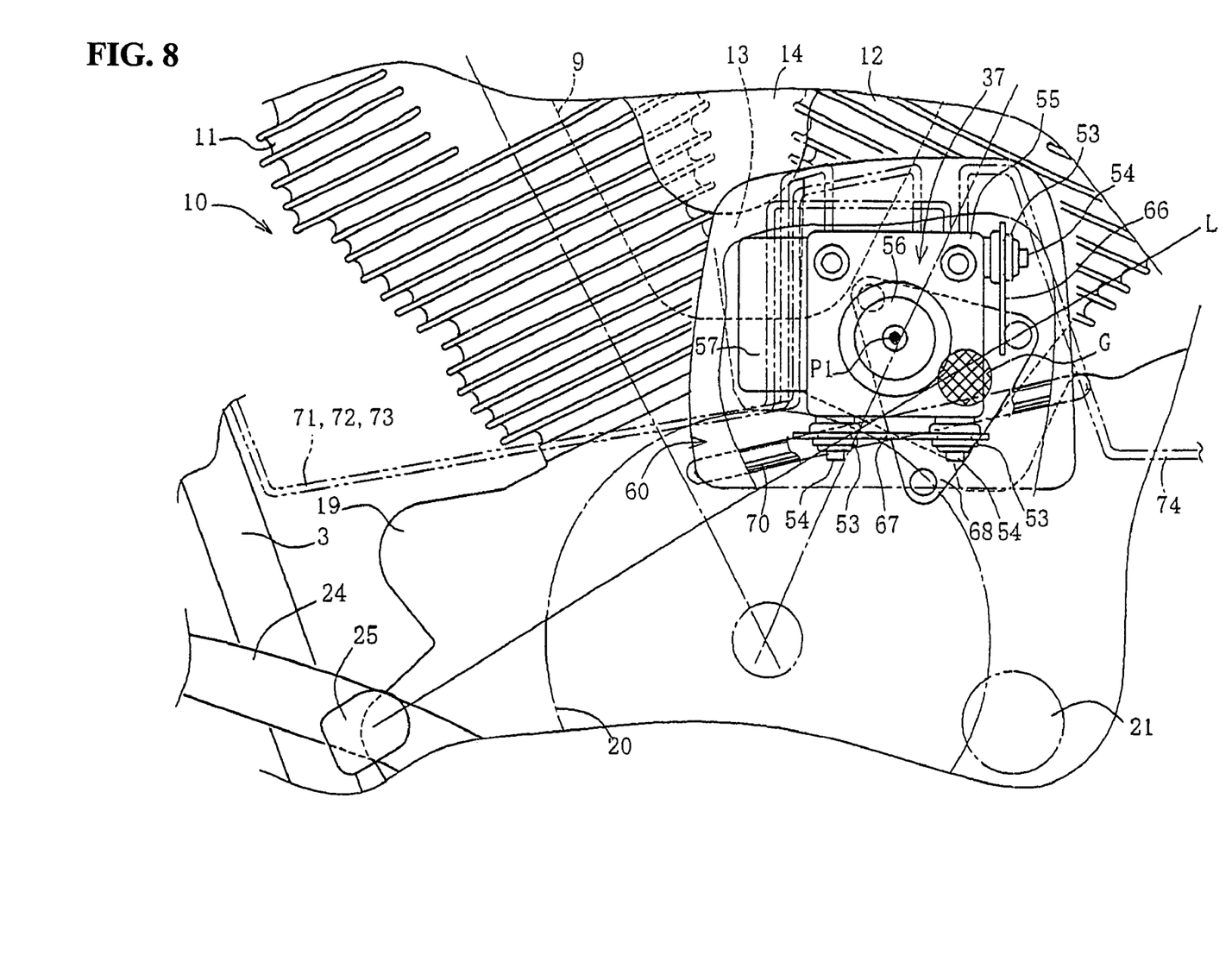
FIG. 8 is an enlarged left side detail view of an engine portion of the motorcycle of FIG. 6.

FIG. 8 is a side plan detail view of a portion of the vehicle body, and is a view showing the side surface of a V-type engine 10 in an enlarged manner. The position of the ABS unit 37 is arranged on a side of the V shaped opening 13 and, to be more accurate, on a left side of a lower portion of the rear cylinder 12. This position, since the rear cylinder 12 is offset to the right side of the vehicle body with respect to the front cylinder 11, as can be clearly understood by reference to FIG. 3, provides a relatively large space which is formed behind the front cylinder 11.

The arrangement space of the ABS unit 37, which is formed behind the front cylinder 11 and on the left side of the rear cylinder 12, is a space which is formed by offsetting the front and rear cylinders from each other in the widthwise direction. This space is a relatively large space which is formed between a front-side profile line of the front cylinder 11 and a rear-side profile line of the rear cylinder 12 as viewed in a side view, wherein the arrangement space of the ABS unit 37 communicates with a relatively narrow V-shaped valley which is directly formed by oppositely facing surfaces of the front cylinder 11 and the rear cylinder 12.

The V-shaped opening 13 of the present invention includes both of the relatively wide space and the relatively narrow V-shaped valley. Further, a state in which the ABS unit 37 is arranged in the relatively wide space constitutes a mode of a state in which the ABS unit 37 is arranged within the V shaped opening 13 between the cylinders 11, 12. Here, the ABS unit 37 is arranged in the relatively wide space and, at the same time, the ABS unit 37 is arranged in the relatively small V-shaped valley in a partially overlapped manner as viewed in a side view.

Further, as can be clearly understood from FIG. 8, with respect to the position of the ABS unit 37, the ABS unit 37 is arranged directly above the crankshaft 20, and has a portion thereof that overlaps a center line of the main shaft 21, which is positioned behind the crankshaft 20. Symbol G indicates a position of the center of gravity of the engine 10. The center P1 of the ABS unit 37 is positioned in front of, slightly above and in the vicinity of the center of gravity G The mounting configuration of the ABS unit 37 will now be described. A rear end surface of a quadrangular body portion 55, as viewed in a side view, is supported at one position on a vertical stay 66 by way of a vibration-dampening rubber grommet 53. In addition, a lower surface of the body portion 55 is supported at two positions on a horizontal stay 67 in the same manner by way of vibration-dampening rubber grommets 53. The vibration-dampening rubber grommets 53 are substantially similar to the vibration control rubber grommets used in the above-mentioned first embodiment, and are fastened to the body portion 55 and the respective stays 66, 67 respectively using bolts 54.

The vertical stay 66 and the horizontal stay 67 are, respectively, integrally formed with an approximately triangular mounting bracket 68, and the mounting bracket 68 is fastened to a side surface of a lower portion of the rear cylinder 12 and also to a side surface of an upper portion of a crankcase 19, using bolts or the like. With respect to the center of gravity G of the engine 10, a lower portion side of the ABS unit 37 is surrounded by a protective member 70 which is inclined obliquely in the rearward and upward direction as viewed in a side view and traverses in the longitudinal direction. Both longitudinal ends of the protective member 70 are fastened to an upper portion of the crankcase 19, together with a fastening portion of a crankcase cover. An upper portion side of a unit cover 60 is overlapped with respective lower portions of the front cylinder 11 and the rear cylinder 12 on the side of the V shaped opening 13, while a lower portion of the unit cover 60 is overlapped with a side surface of an upper portion of the crankcase 19.

Figure 9:
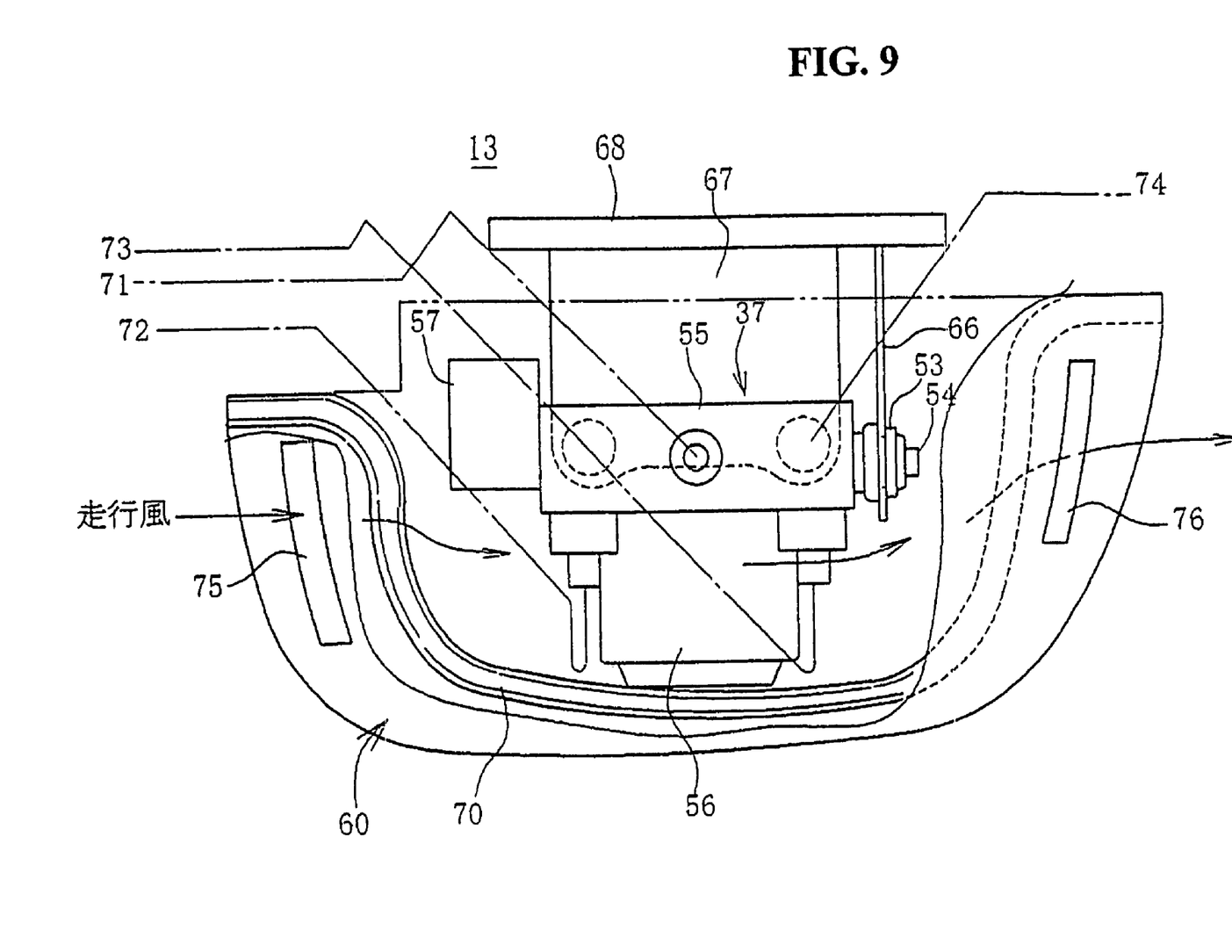
FIG. 9 is top plan view of an ABS unit mounted on the motorcycle of FIG. 6, showing a cover surrounding an outer periphery of the ABS unit, in which arrows indicate airflow into and out of the interior space of the cover.
Figure 10:
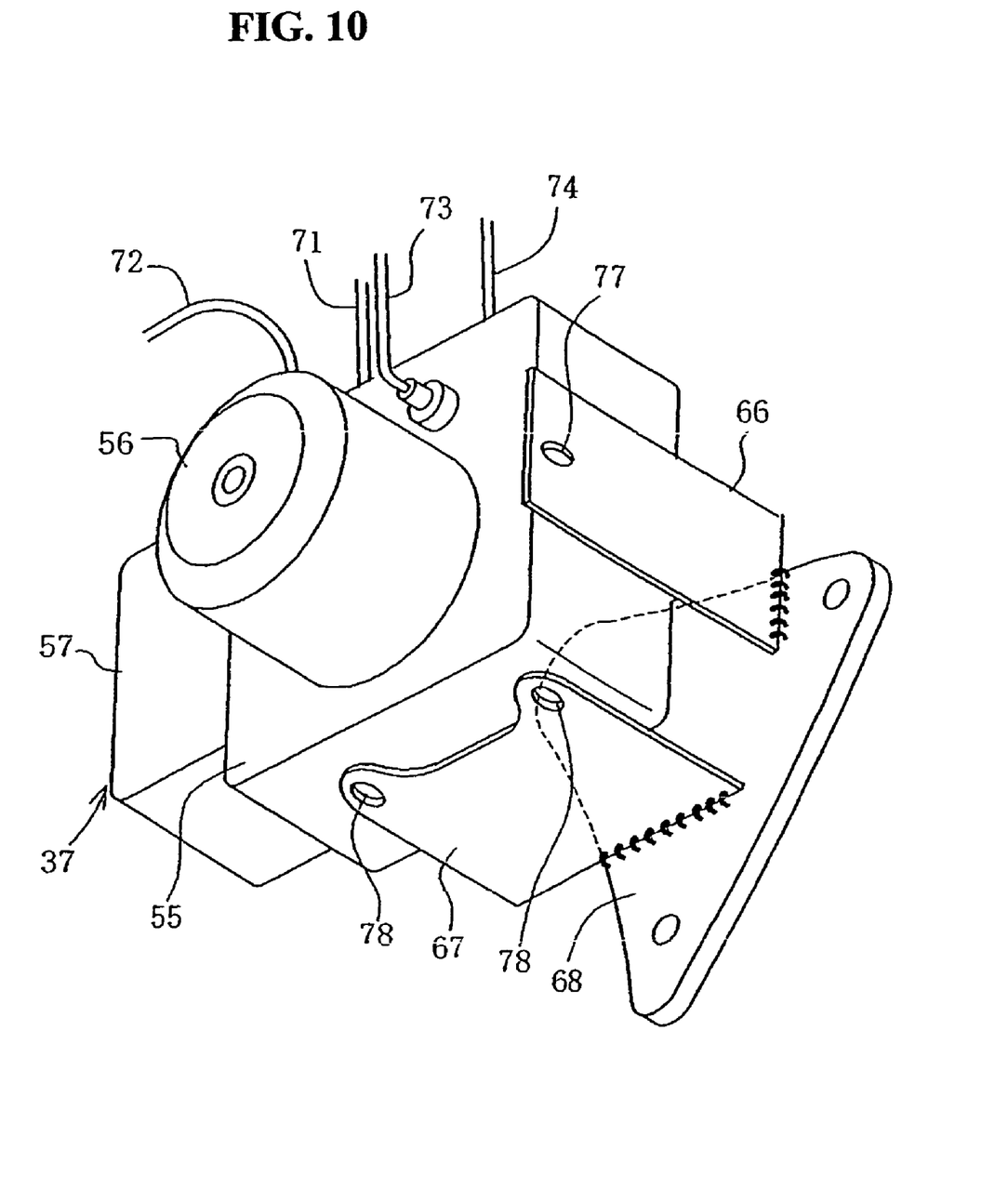
FIG. 10 is a perspective view of the ABS unit of the motorcycle of FIG. 6.

In FIGS. 8-10, numeral 71 indicates a pipe which is connected to a front master cylinder 40 (FIG. 7), and numerals 72, 73 indicate pipes for depressurizing and pressurizing which are connected to a front-wheel brake 30 (FIG. 6). The pipes 71 to 73 extend toward a front portion of the vehicle body and are bent upwardly, and arranged upwardly toward the head pipe 26 along the down pipe 3.

The pipes 72 and 73, used for depressurizing and pressurizing the brake, extend downwardly toward the front-wheel brake 30 from the vicinity of a head pipe 26 along a front fork 27. Numeral 74 indicates a pipe which is connected to a rear master cylinder 39 (FIG. 7) and extends rearwardly toward a rear master cylinder 38.

FIG. 9 is a plan view of the unit cover 60 and the ABS unit 37 in a mounting state. As shown in this drawing, the unit cover 60 has a container shape which is opened toward the V-type engine 10 side, which surrounds a periphery of the ABS unit 37, and is formed of a suitable material such as metal or a resin.

A surface of the unit cover 60 can be arbitrarily formed such as a spherical shape, a curved shape or a planner shape which can be easily formed and can easily increase a volume thereof. By forming the surface of the unit cover 60 into the curved surface or a spherical surface, the resistance of the cover and the vehicle to a traveling wind is reduced.

A slit-like wind inlet 75 and a wind outlet 76 are formed in a front surface and a back surface, respectively, of the unit cover 60. The unit cover 60 takes a traveling wind into the inside of the unit cover 60 through the front-side wind inlet 75, and discharges the traveling wind rearwardly through the rear-side wind outlet 76, thus cooling the ABS unit 37 which is liable to easily elevate to a high temperature during an operation thereof.

Here, at least one of the wind inlet 75 and the wind outlet 76 is formed in the unit cover 60. This is because that even with only one of these openings, the ventilation in the inside of the unit cover 60 is enhanced, thus enabling the cooling of the ABS unit 37. Further, a plural number of wind inlets 75 and wind outlets 76 may be formed in suitable portions of the unit cover 60.

The protective member 70 surrounds the ABS unit 37 in a substantially arcuate shape ranging from a front portion to a rear portion by way of an outer side of the ABS unit 37. The unit cover 60 is integrally formed with the protective member 70 and is supported on the crankcase 25 by way of the protective member 70.

FIG. 10 is an enlarged perspective view of the ABS unit 37. The vertically arranged stay 66 and the laterally arranged stay 67 are welded to the mounting bracket 68 in a state that both stays 66, 67 are perpendicularly erected with respect to the mounting bracket 68. The vibration control rubber grommets 53 (FIG. 8) are fitted into mounting holes 77, 78, whereby both the stays are mounted in a vibration controlling matter via the vibration control rubber grommets 53.

Next, the manner of operation of this embodiment is explained. Since the ABS unit is arranged in the side space of the front cylinder 11 and the rear cylinder 12 of the engine 10 which has not been utilized for arrangement of parts and has conventionally been considered as a dead space, it is possible to easily arrange the ABS unit 37 by making use of the dead space. Accordingly, it is possible to easily mount the ABS unit 37 on the vehicle without adding a large change to a base model which is not provided with the ABS unit 37.

Further, by arranging exhaust-system parts including mufflers 17, 18, which are heavy objects, on the right side of the vehicle body and by arranging the ABS unit 37 on the left side of the V shaped opening 13, which is arranged on the left side of the vehicle body, with the vehicle body center C sandwiched between the exhaust-system parts and the ABS unit 37, it is possible to arrange these heavy objects in a laterally distributed manner and hence, the weight distribution of the vehicle body in the lateral direction can be optimized.

Further, a cover 9a of the air cleaner 9 projects to the right side of the vehicle body and the unit cover 60 of the ABS unit 37 projects leftwardly to the left side of the vehicle body. As a result, the vehicle receives the traveling wind at right and left sides of the vehicle body in the substantially same manner whereby the difference in the flow of air at right and left sides of the vehicle body can be decreased.

Further, by forming the wind inlet 75 in the front surface of the unit cover 60 and the wind outlet 76 in the back surface of the unit cover 60, it is possible to direct the traveling wind through the space defined inside the unit cover 60 for cooling the ABS unit 37. As a result, the ABS unit 37, which easily elevates to a high temperature due to the operation thereof, can be efficiently cooled.

Further, by interposing the mounting bracket 68 as the joining portion between the ABS unit 37 and the engine 10, and by allowing the mounting bracket 68 to surround the center of gravity G of the engine 10 so as to arrange the joining portion of the ABS unit 37 in the vicinity of the center of gravity G, it is possible to make the ABS unit 37 overlap the center of gravity G as viewed in the side view.

Accordingly, it is possible to arrange the ABS unit 37, which is a heavy object, in the vicinity of the center of gravity G, which corresponds to the center of vibration of engine 10. As a result, the influence of engine vibrations transmitted to the ABS unit 37 can be minimized. Accordingly, the vibration control mounting structure between the ABS unit 37 and the engine 10 and the vibration control mounting structure between the engine 10 and the vehicle body frame 1 can be miniaturized.

Further, the ABS unit 37 is arranged directly above the crankshaft 20 as viewed in a side view, it is possible to arrange the ABS unit 37. Since the crankshaft 20 constitutes the position of the center of gravity in the longitudinal direction of the whole vehicle body, positioning the ABS unit directly above the crankshaft 20 realizes a concentration of the mass at the center of gravity.

Further, by arranging the maximum side projecting point P1 of the ABS unit 37 in front of the straight line L which connects the sitting reference point P2 of the seat and the step 25 as viewed in a side view, it is possible to afford a relatively large decree of freedom to the landing position of the legs 65 on right and left sides of the vehicle body.

Here, the present invention is not limited to the above-mentioned embodiments and some constitutional elements may be changed in various forms. For example, the ABS unit 37 may be applicable to any one of a front-wheel brake use, a rear-wheel brake use or front-and-rear-wheel brake use. Further, an electrically operated ABS unit may be substituted for the disclosed hydraulically operated unit. Further, although the brake control devices of the above-mentioned respective embodiments are formed of the ABS unit, the brake control units may be formed of a control unit for front-and-rear-wheel interlocking control.

Further, when the ABS unit is arranged on the side of the engine, the engine is not limited to a V-type engine. It is sufficient that the vehicle has the constitution which allows the utilization of the dead space on the side of the engine. Further, when the brake control device is arranged on the side of the V-type engine, the brake control device may be arranged on the front cylinder side instead of the rear cylinder side described in the embodiments. Also in this case, it is possible to make use of the space formed by offsetting the front and rear cylinders from each other in the vehicle body direction. Further, the V-type is not limited to the longitudinal V-type and may be other V-types including the vertical V-type or lateral V-type.

Thus, while a working example of the present invention has been described above, the present invention is not limited to the working example described above, but various design alterations may be carried out without departing from the present invention as set forth in the claims.

What is claimed is:

1. A mounting arrangement of a brake control device for a motorcycle, the motorcycle comprising
    a vehicle body frame,
    said vehicle body frame comprising
        a head pipe;
        left and right main pipes extending rearwardly from the head pipe;
        left and right pivot plates extending downwardly from respective said left and right main pipes; and
        a cross pipe disposed between said left and right pivot plates;
    an engine supported by the vehicle body frame,
    a hydraulic brake mechanism,
    a brake control device operatively connected to the hydraulic brake mechanism,
    a rear wheel,
    a rear swing arm supporting the rear wheel at a rear end thereof, and
    a pivot shaft which pivotally mounts a front end of the rear swing arm to the vehicle body frame,
    wherein the brake control device is configured to control a hydraulic pressure of the hydraulic brake mechanism, and is mounted on said cross pipe of the vehicle body frame between said left and right pivot plates at a position below the pivot shaft.

2. The mounting arrangement of a brake control device for a motorcycle according to claim 1, the motorcycle further comprising an exhaust pipe and a muffler, and wherein
    the exhaust pipe extends from the engine and is connected to the muffler,
    the muffler is arranged on one lateral side of the vehicle body frame, and
    the brake control device is arranged on another lateral side of the vehicle body frame that is opposite the lateral side on which the muffler is arranged.

3. The mounting arrangement of a brake control device for a motorcycle according to claim 1, wherein:
    the motorcycle further comprises a drive shaft configured to drive the rear wheel, and
    the brake control device is arranged below the drive shaft.

4. The mounting arrangement of a brake control device for a motorcycle according to claim 1, wherein the motorcycle further comprises a plurality of rubber members interposed between the brake control device and the vehicle body frame, so as to reduce vibration of the brake control device.

5. The motorcycle of claim 1, wherein the vehicle body frame further comprises:
    a vertical frame member disposed between said pivot plates,
    wherein a pivot shaft extends between the vertical frame member and one of said pivot plates for supporting a swing arm thereon, and
    wherein the brake control device is disposed on a side of the vertical frame member opposite the pivot shaft.

6. The mounting arrangement of a brake control device for a motorcycle according to claim 1,
    wherein the brake control device is positioned on the cross pipe at a distance d from a vehicle body center line, where d is less than of a length of the cross pipe.

7. The mounting arrangement of a brake control device for a motorcycle said motorcycle comprising
    a vehicle body frame,
    an engine supported by the vehicle body frame,
    a hydraulic brake mechanism,
    a brake control device operatively connected to the hydraulic brake mechanism, a rear wheel, a rear swing arm supporting the rear wheel at a rear end thereof, and a pivot shaft which pivotally mounts a front end of the rear swing arm to the vehicle body frame, wherein the brake control device is configured to control a hydraulic pressure of the hydraulic brake mechanism, and is mounted to the vehicle body frame at a position below the pivot shaft;

wherein the vehicle body frame comprises left and right pivot plates and a vertical frame member disposed between said pivot plates, wherein the pivot shaft extends between the vertical frame member and one of said pivot plates, and wherein the brake control device is disposed on a side of the vertical frame member opposite the pivot shaft.

8. A motorcycle comprising:

a vehicle body frame, an engine supported on the vehicle body frame, a hydraulic brake mechanism, a brake control device operatively connected to the brake mechanism so as to control hydraulic pressure of the brake mechanism, and an exhaust system comprising a tail pipe and a muffler that directs exhaust gases from the engine, wherein the brake control device is disposed on a first lateral side of the motorcycle, and the exhaust system is disposed on a lateral side of the motorcycle opposed to the first lateral side;

wherein the vehicle body frame comprises a head pipe;

left and right main frame pipes extending rearward from the head pipe;

left and right down tubes extending downward from the head pipe;

left and right lower pipes extending rearward from a lower end of the respective left and right down tubes;

a left pivot plate extending substantially vertically and connecting a rear end of the left main frame to a rear end of the left lower pipe, a right pivot plate extending substantially vertically and connecting a rear end of the right main frame to a rear end of the right lower pipe;

a lower cross pipe connecting the rear end of the left lower pipe to the rear end of the right lower pipe;

an upper cross pipe connecting an intermediate portion of the left pivot plate to an intermediate portion of the right rear frame; and a vertical frame member extending substantially vertically between a center of the lower cross pipe and a center of the upper cross pipe, wherein the brake control device is disposed on the lower cross pipe so as to lie between the vertical frame member and one of the left and right pivot plates.

9. The motorcycle of claim 8, the motorcycle further comprising a rear wheel, a rear swing arm supporting the rear wheel at a rear end thereof, and a pivot shaft which pivotally mounts a front end of the rear swing arm to the vehicle body frame, wherein the pivot shaft extends between the vertical frame member and the other one of the left and right pivot plates.

10. A motorcycle comprising:

a vehicle body frame, an engine supported on the vehicle body frame, a hydraulic brake mechanism, a brake control device operatively connected to the brake mechanism so as to control hydraulic pressure of the brake mechanism, and an exhaust system comprising a tail pipe and a muffler that directs exhaust gases from the engine, wherein the brake control device is disposed on a first lateral side of the motorcycle, and the exhaust system is disposed on a lateral side of the motorcycle opposed to the first lateral side;

wherein the vehicle body frame comprises:

left and right pivot plates, a vertical frame member disposed between said pivot plates, and a pivot shaft extending between the vertical frame member and one of said pivot plates for supporting a swing arm thereon, wherein the brake control device is disposed on a side of the vertical frame member opposite the pivot shaft.

11. The motorcycle of claim 10, wherein the engine comprises cylinders arranged in a V-shaped configuration extending in a longitudinal direction of the vehicle body frame, said cylinders including a forwardly inclined cylinder and a rearwardly inclined cylinder.

12. The motorcycle of claim 11, wherein the forwardly inclined cylinder is slightly laterally offset relative to the rearwardly inclined cylinder.

13. The motorcycle of claim 10, wherein the engine comprises a crankshaft and a mainshaft disposed rearward of the crankshaft, and wherein the brake control device is disposed so as to lie above the crankshaft, and so that a portion of the brake control device overlies a centerline of the main shaft.

14. The motorcycle of claim 10, wherein the brake control device is disposed to overlap a position of center of gravity of the engine when viewed from a side of the vehicle.

* * * * *